United States Patent [19]

Jensen

[11] Patent Number: 4,476,616
[45] Date of Patent: Oct. 16, 1984

[54] LOCKING RING AND STAPLING SYSTEM

[76] Inventor: George W. Jensen, P.O. Box 18233, Asheville, N.C. 28814

[21] Appl. No.: 409,936

[22] Filed: Aug. 20, 1982

[51] Int. Cl.³ .............................................. B23P 11/00
[52] U.S. Cl. .................................... 29/243.56; 24/27
[58] Field of Search ................. 29/243.56, 283.5, 811, 29/818; 140/93 A, 93 D, 82; 227/83; 24/27, 28, 29

[56] References Cited

U.S. PATENT DOCUMENTS

| | | |
|---|---|---|
| 372,686 | 11/1887 | Lester . |
| 610083 | 8/1898 | Rice . |
| 642,417 | 1/1900 | Bennett . |
| 860,452 | 7/1907 | Dorner . |
| 1,214,749 | 2/1917 | Bruflat . |
| 1,667,463 | 4/1928 | Rose . |
| 2,031,889 | 2/1936 | Himberger . |
| 2,601,709 | 7/1952 | Reichardt . |
| 3,120,230 | 2/1964 | Skold ............................... 24/27 |
| 4,003,118 | 1/1977 | Jensen ........................ 29/243.56 |
| 4,099,298 | 7/1978 | Gimenez .......................... 24/27 |
| 4,107,824 | 8/1978 | Lussier ............................ 24/27 |
| 4,261,098 | 4/1981 | Lincoln ...................... 29/243.56 |

FOREIGN PATENT DOCUMENTS

| | | |
|---|---|---|
| 150462 | 9/1951 | Australia . |
| 256424 | 5/1963 | Australia . |
| 697379 | 11/1964 | Canada . |
| 779971 | 1/1935 | France ......................... 140/93 D |

Primary Examiner—James L. Jones, Jr.
Attorney, Agent, or Firm—David M. Carter

[57] ABSTRACT

There is provided an improved locking ring which may be used as a staple and a staple gun for clinching the locking ring. An open ring of spring-like material is provided having a pair of free ends with loops bent back. The open ring is clinched by intermating these loops thus forming a strong locking ring. A staple gun apparatus is provided to clinch the locking ring. A specially shaped die at the end of the staple gun having grooves which are cross-sectional mirror images of one another is utilized.

9 Claims, 6 Drawing Figures

LOCKING RING AND STAPLING SYSTEM

BACKGROUND OF THE INVENTION

This invention relates to an improved stapling system. More particularly it relates to a locking ring and apparatus for clinching such locking ring.

Staples have long been used to join two materials together. The staple normally consists of an open loop piece of metal. The loop is normally closed by the use of a staple gun, which includes a die at its end for bringing the free ends of the staple together or close together. An example of a prior art stapling system is shown in U.S. Pat. No. 4,003,118 issued Jan. 18, 1977, to Jensen. Another prior art staple system is shown in U.S. Pat. No. 2,031,889 issued to Himberger. Both of these prior art patents show staples commonly referred to as hog rings wherein their free ends are brought into contact with one another.

While these two systems will work quite well for certain end uses, a need has arisen to provide a strong locking ring which will be adequate to hold wire screen together under high tension. A particular need is in the erosion control industry, where large metal baskets are formed using wire mesh. These baskets are filled with large rocks and placed in areas where erosion is prevalent. It has been shown that the above-described prior art staple systems simply are not adequate to hold these baskets together when in place. Currently these types of soil erosion baskets are manufactured using a very labor intensive method of hand-winding wire about the places on the basket to be joined.

OBJECTS OF THE INVENTION

It is one object of this invention to provide an improved stapling system.

It is another object to provide a locking ring which is capable of withstanding very high lateral forces.

It is another object to provide an apparatus for clinching the improved locking ring.

SUMMARY OF THE INVENTION

In accordance with one form of this invention there is provided a locking ring which is an open ring of material having spring resilience. The ring has a center section and a pair of arms extending from the center section. Each arm has a free end which is bent back towards its respective arm forming locking loops. The arms are adapted to be moved toward one another and the loops adapted to interlock with one another under spring tension forming a closed locking ring.

In another form of this invention there is provided an apparatus for clinching a locking ring described above and in particular where the free ends of the arms lie on different planes prior to clinching. The apparatus includes a chamber for holding the locking ring while the locking ring is in its open condition. A die is connected to the chamber for clinching the locking ring. A mechanism is provided for forcing the locking ring from the chamber through the die and out of the apparatus. The die includes a feed-through section which is open on its top, bottom and far end but is closed on its opposing sides. Each of the sides has a groove, the cross section of which are mirror images of one another. Each groove has a top, a bottom and a side surface. Each side surface is tapered inwardly in the direction of movement of the locking ring as it is forced out of the apparatus. The top surface of each groove is at an angle with respect to the side surface which is different from the bottom surface.

BRIEF DESCRIPTION OF THE DRAWINGS

The subject matter of the invention is set forth in the appended claims. The invention itself together with further objects and advantages thereof can be better understood by reference to the following description taken in conjunction with the accompanying drawings in which:

DESCRIPTION OF THE PREFERRED EMBODIMENT

Figure 1:
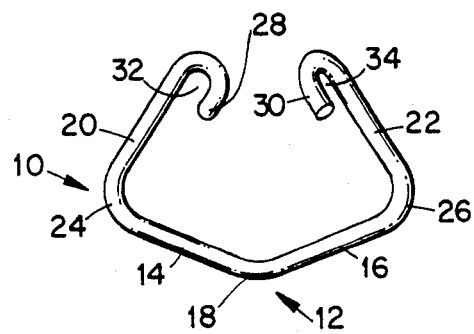
FIG. 1 is a plan view of the locking ring of the subject invention in its open condition.
Figure 3:
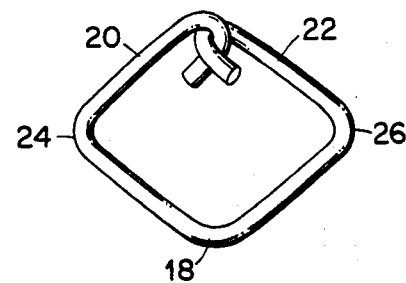
FIG. 3 is a plan view of the locking ring of FIG. 1 after the locking ring has been clinched.

Referring now more particularly to FIG. 1, locking ring 10 is shown in its open (unlocked or unclinched) condition. Locking ring 10 is normally made of a resilient metal, such as, for example, steel wire, capable of imparting spring forces. However, other materials may be used. Locking ring 10 includes center section 12, having links 14 and 16 which meet at vertix 18. The angle of this vertix 18 changes depending on whether or not the locking ring is in its clinched or unclinched condition. The other ends of the center section links meet arms 20 and 22 at bends 24 and 26. Bends 24 and 26 are normally the places where the materials to be locked or coupled together, such as wire screen, contact the ring. It is also the place where large lateral forces are normally applied by the wire that is to be coupled. The free ends 28 and 30 of arms 20 and 22 are bent back on their respective arms approximately, in this embodiment 180 degrees, forming locking loops 32 and 34. These locking loops 32 and 34 are adapted to interlock with one another as shown in FIG. 3 by applying inward force at bends 24 and 26, thereby decreasing the angle of vertix 18.

Figure 2:
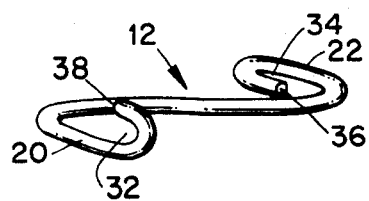
FIG. 2 is a front elevation view of the locking ring of FIG. 1.

Referring now to FIG. 2 which is a front elevation view of the locking ring of FIG. 1, as can be seen arm 22 and arm 20 are on different planes from center section 12 and, furthermore, are on different planes from one another. This feature is provided so that the locking loops may be readily interlocked with one another by merely applying inward force to bends 24 and 26. Once the locking loops have been intermated the loop is held in its closed condition as shown in FIG. 3 by the spring forces imparted by the material on these locking loops in a direction away from one another. It should be noted in FIG. 3 that the radius of curvature of the locking loops is smaller than the radius of curvature of the bends 24 and 26, as well as vertix 18. Therefore, when large forces are applied on bends 24 and 26 away from each other, the locking ring will tend to flatten out rather than release at the locking loops. The forces required to unlock or unclinch the locking ring will be much greater than the force required to open the aforementioned prior art hog ring. As the locking ring is flattened, making angles 24 and 26 approximately 0 degrees, the stress in the locking loop is transferred to the wire of the ring.

It should be noted in FIG. 2 that the end 36 of loop 34 points downwardly and the end 38 of loop 32 points upwardly enhancing the ability of the locking loop to be clinched. Furthermore, after clinching the loops the locking loop arms 20 and 22 then are on the same plane. The geometric centers of the locking loops 32 and 34 are on the same plane as the center section 12 of the locking loops even prior to clinching.

Figure 5:
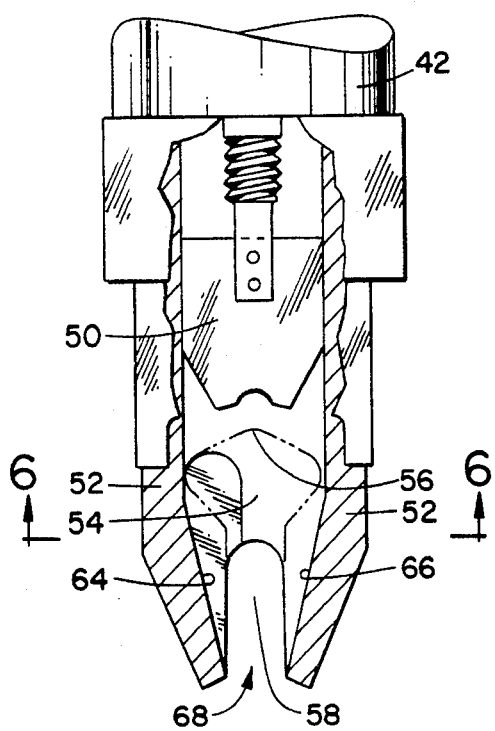
FIG. 5 is a partial top view of the apparatus of FIG. 4.
Figure 4:
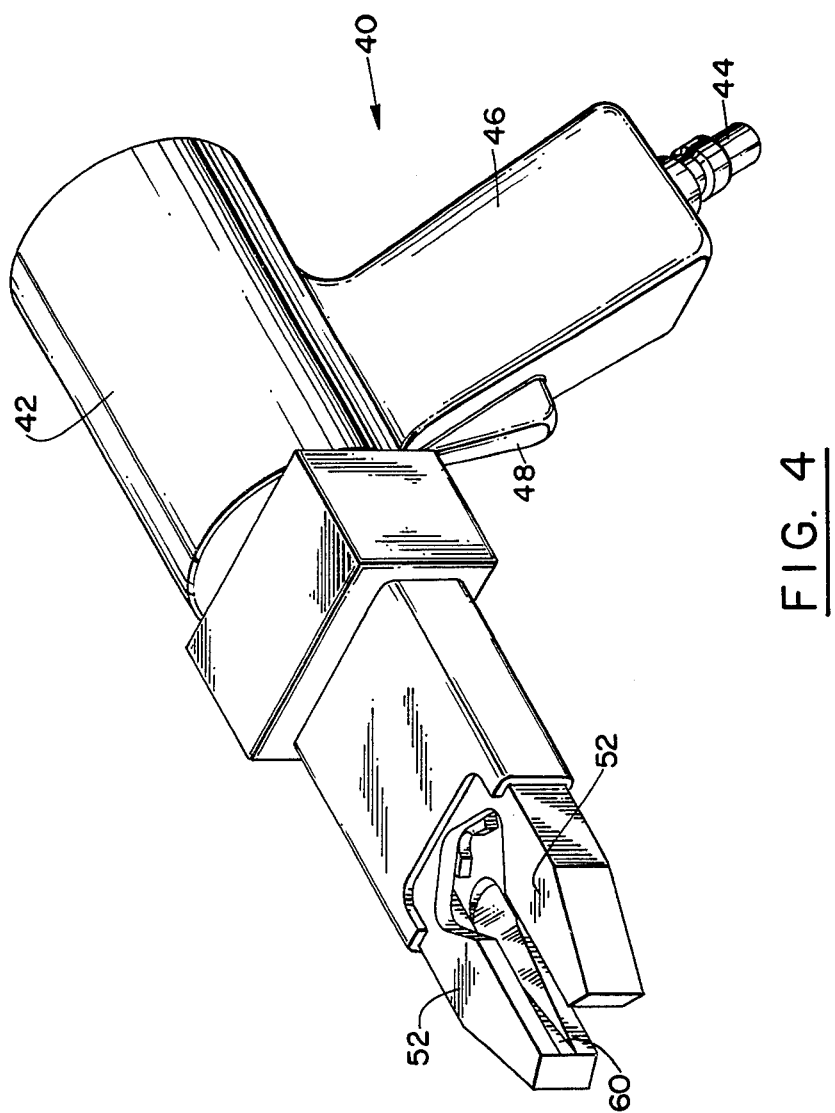
FIG. 4 is a pictorial view of an apparatus for clinching the locking ring shown in FIG. 1.

Various types of staple guns may be used to clinch the locking ring described above; however, a gun specially designed for this locking ring has been developed as shown in FIG. 4. Staple gun 40 may be of the type generally described in U.S. Pat. No. 4,003,118 issued Jan. 18, 1977, however, having a special die described below. Furthermore, this staple gun preferably uses a pneumatic piston system for clinching the locking ring. Staple gun 40 includes air clyinder 42 which is coupled through air input coupler 44. A valve is included (not shown) inside of handle 46 and is controlled by trigger 48. Staple ram 40 as shown in FIG. 5 is connected to air cylinder 42 and is responsive thereto. Again referring to FIG. 4, staple clinching die 52 is connected to the end of staple gun 40. Clinching die 52 is normally made of hardened steel and includes staple holding chamber 54, which receives the locking ring shown in FIG. 1 with the center section 12 of the locking ring abutting against rear wall 56 of the die. Rear wall 56 is in a shape conforming generally to the center section of the locking ring prior to it being clinched.

Die 52 further includes opened section 58, which is adapted to receive the two pieces which are to be stapled or locked together such as, for example, two links of fence wire or wire for forming a basket (not shown). As can be seen from FIG. 4, die 52 includes groove 60 and as can be seen from FIG. 6, groove 62. The side walls 64 and 66 of these respective grooves taper inwardly towards the open end of die 52. Bends 24 and 26 of the locking ring ride along these tapered walls 64 and 66 causing arms 20 and 22 to move toward one another and also causing the locking loops 32 and 34 to move towards one another and eventually link with one another as shown in FIG. 2. This linking will occur near the end 68 of the die 52, thus circumscribing the two links of fence or basket wire.

Figure 6:
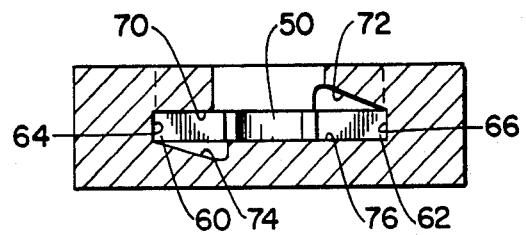
FIG. 6 is a cross-sectional view of a portion of the apparatus of FIG. 5 taken along the lines 6—6.

As can be seen from the cross-sectional view of FIG. 6, grooves 60 and 62 also include top and bottom walls which are mirror images of one another. Top wall 70 forms a different angle with respect to its side wall 64 than does top wall 72 of groove 62 form with respect to its side wall 66. Bottom wall 74 also forms an angle differing from bottom wall 76 both as to their respective side walls. These differing angle to surfaces are formed to accommodate the shape of the locking ring 10, as shown in FIG. 2, in that the arms 20 and 22 are on differing planes.

Ram 50 engages the rear portion of center section 12 and in response to pneumatic piston action from air cylinder 42 forces the locking ring through the die for clinching. This ram 50 travels through the center of die 52. The end of the ram 50 which makes contact with the locking ring may be somewhat curved to accommodate the shape of the center section of the locking ring and to provide stability.

From the foregoing description of the preferred embodiment of the invention, it is apparent that many modifications may be made therein. It is intended that the appended claims cover all such modifications that fall within the true spirit and scope of this invention.

I claim:

1. A locking ring comprising:
an open ring of material; said material of a type which imparts spring resilience to said ring; said ring having a center section of two substantially straight links and a pair of substantially straight portions forming arms extending from said center section, said center section including a first bend between the straight links forming a first angle of greater than 90° but less than 180°; a second bend forming a second angle of less than 90° located between said center section and one of said arms; a third bend forming a third angle of less than 90° located between said center section and the other of said arms; the sum of said first, second and third angles being greater than 180° but less than 360°; each arm being in a different plane from the center section and each other and having a free end; each free end being bent back toward its respective arm forming locking loops; said locking loops each forming a continuous arc of at least 120° but less than 360°; said arms not contacting one another while said ring is in the unlocked open condition; said arms adapted to be moved toward one another and said loops adapted to interlock with one another under spring tension forming a closed locked ring.

2. A locking ring as set forth in claim 1, wherein one of said arms lies on a different plane from the other.

3. A locking ring as set forth in claim 1, wherein said center section includes a pair of lengths meeting at a vertex; opposing ends of said lengths being connected to said respective arms forming angles with respect to said arms.

4. A locking ring as set forth in claim 3, wherein the radius of curvature of said interlocked loops being smaller than any other radii of curvature within said ring such that when opposing outward forces are applied to said ring, the ring will collapse before the loops come apart.

5. A staple gun for clinching a locking ring having free ends which lie on differing planes prior to clinching, said gun comprising:
a chamber for holding the ring while the ring is in its open condition; a die connected to said chamber for clinching the ring; means for forcing the ring from said chamber through said die and out of said gun; said die including a feed-through section; said feed-through section being open on its top, its bottom and its far end but closed on its opposing sides; said sides each having a groove; each groove having top, bottom and side surfaces; each side surface being tapered inwardly in the direction of movement of the staple; the top surface of each groove forming a different angle with respect to its side surface than said bottom surface of the same groove.

6. A staple gun as set forth in claim 5, wherein the top surface of one of the raised grooves forms an angle of approximately 90 degrees with respect to its side surface and the bottom surface of the other groove forming an angle of approximately 90 degrees with respect to its side surface.

7. A staple gun as set forth in claim 5, wherein said means for forcing the ring through said die is a pneumatically operated drive mechanism.

8. A staple gun as set forth in claim 5 wherein said grooves have cross sections which are substantial mirror images of one another.

9. A locking system comprising a staple gun for clinching a locking ring, including a chamber for holding the ring while the ring is in its open condition; a die connected to said chamber for clinching the ring; means for forcing the ring from said chamber through said die and out of said gun; said die including a feed-through section; said feed-through section being open on its top, bottom and far end but closed on its opposing sides; said sides each having a groove whose cross sections are substantially mirror images of each other; each groove having top, bottom and side surfaces; each side surface being tapered inwardly in the direction of movement of the staple; the top surface of each groove forming a different angle with respect to its side surface than the bottom surface of the same groove; said ring being an open ring of material prior to passing through said die; said material of a type imparting spring resilience to said ring; said ring having a center section and a pair of arms extending from said center section; each arm having a free end; each free end being bent back towards its respective arm forming locking loops; said arms adapted to be moved towards one another by said die and said loops adapted to interlock with one another under spring tension forming a closed locked ring.

* * * * *